United States Patent [19]

Sasaki

[11] Patent Number: 4,642,273
[45] Date of Patent: Feb. 10, 1987

[54] REFORMER REACTION CONTROL APPARATUS FOR A FUEL CELL

[75] Inventor: Akira Sasaki, Amagasaki, Japan

[73] Assignee: Mitsubishi Denki Kabushiki Kaisha, Tokyo, Japan

[21] Appl. No.: 744,294

[22] Filed: Jun. 13, 1985

Related U.S. Application Data

[63] Continuation-in-part of Ser. No. 612,020, May 18, 1984, abandoned.

[30] Foreign Application Priority Data

May 19, 1983 [JP] Japan .................................. 58-89367

[51] Int. Cl.$^4$ ............................................ H01M 8/04
[52] U.S. Cl. ......................................... 429/22; 429/25
[58] Field of Search ..................................... 429/22, 25

[56] References Cited

U.S. PATENT DOCUMENTS

| | | | |
|---|---|---|---|
| 3,432,356 | 3/1969 | Christianson | 429/22 |
| 3,585,077 | 6/1971 | Waldman | 136/86 |
| 3,585,078 | 6/1971 | Sederquist | 136/86 |
| 3,668,013 | 6/1972 | Franz | 136/86 B |
| 3,879,218 | 4/1975 | Kellen et al. | 429/22 |
| 3,961,986 | 6/1976 | Waldman | 136/86 B |
| 4,002,805 | 1/1977 | Waldman | 429/17 |
| 4,098,959 | 7/1978 | Fanciullo | 429/25 |
| 4,098,960 | 7/1978 | Gagnon | 429/25 |
| 4,436,793 | 3/1984 | Adlhart | 429/25 X |

OTHER PUBLICATIONS

A. M. Mearns, "Chemical Engineering Process Analysis", pp. 94–120.
T. K. Subramaniam, "Estimate Reformer Gas Composition", Sep. 1967, vol. 46, No. 9, pp. 169–173.

Primary Examiner—Brian E. Hearn
Assistant Examiner—Stephen J. Kalafut
Attorney, Agent, or Firm—Wenderoth, Lind & Ponack

[57] ABSTRACT

When a load of a fuel cell to which hydrogen gas is supplied from a fuel reformer reactor is suddenly decreased, the temperature in the reformer reactor is rapidly increased, thereby damaging the construction materials thereof. In order to solve this problem, a controlling system for the reforming reaction transitionally reduces the pressure in the reformer reactor when the sudden decrease of load takes place, so as to increase the reaction rate in said reformer reactor, and to increasing the quantity of endothermic heat by said reaction, thereby controlling the rapid increase of temperature in the reformer reactor.

2 Claims, 7 Drawing Figures

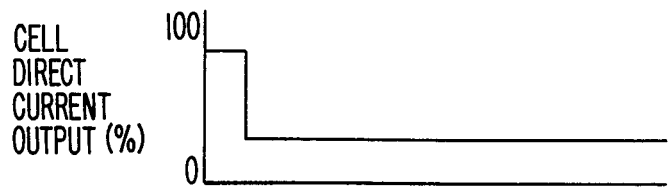
FIG. 4(a). CELL DIRECT CURRENT OUTPUT (%)
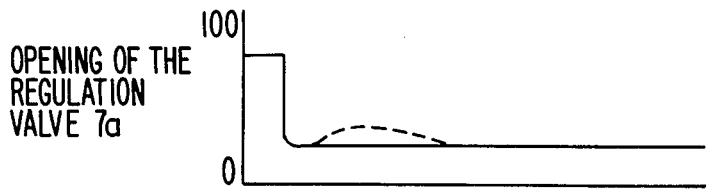
FIG. 4(b). OPENING OF THE REGULATION VALVE 7a
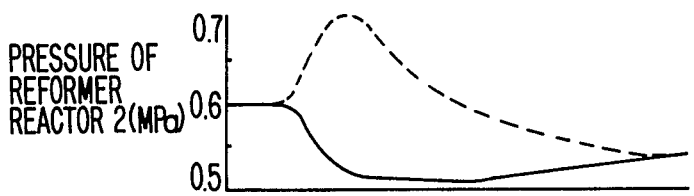
FIG. 4(c). PRESSURE OF REFORMER REACTOR 2 (MPa)
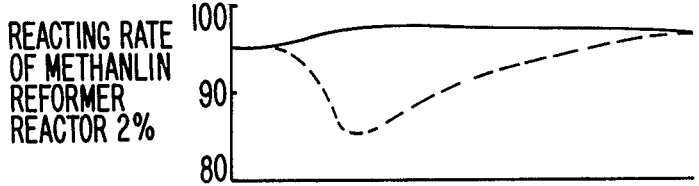
FIG. 4(d). REACTING RATE OF METHANLIN REFORMER REACTOR 2 %
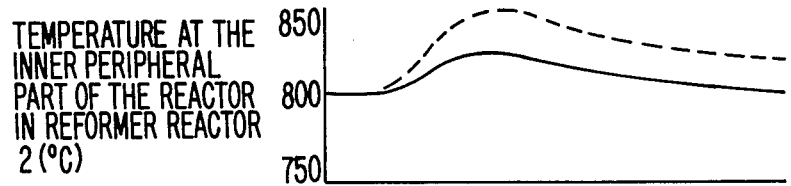
FIG. 4(e). TEMPERATURE AT THE INNER PERIPHERAL PART OF THE REACTOR IN REFORMER REACTOR 2 (°C)
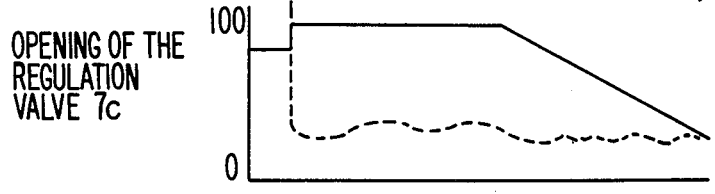
FIG. 4(f). OPENING OF THE REGULATION VALVE 7c
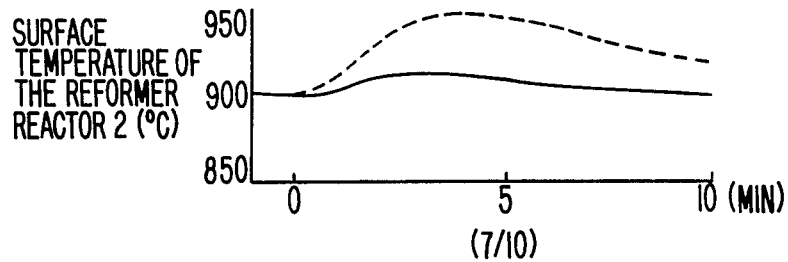
FIG. 4(g). SURFACE TEMPERATURE OF THE REFORMER REACTOR 2 (°C)

REFORMER REACTION CONTROL APPARATUS FOR A FUEL CELL

This application is a continuation-in-part of now abandoned application Ser. No. 612,020, filed May 18, 1984 now abandoned.

BACKGROUND OF THE INVENTION

This invention relates to a control system for a reformer reactor which supplies hydrogen to a fuel cell. Particularly, this invention relates to a control system to prevent irregular heating in a reformer reactor.

DESCRIPTION OF THE PRIOR ARTS

In the past, there was an apparatus such as the type of reformer reaction control system shown in FIG. 1.

This system is composed of a fuel reformer apparatus 1 comprising a reformer reactor 2 and a burner 3, flow meters 6a, 6b, 6c, regulator valves 7a, 7b, 7c, ammeter 8, flow regulators 9a, 9b, 9c, computing unit, or calculator 10 which calculates the required reformer gas flow and natural gas flow as the raw material depending upon the output to load 5 from a cell 4 measured by the ammeter 8 and gives set point values to each flow regulator 9a, 9c, and also includes ratio setting means, or ratio station 11 which calculates steam flow according to a steam/carbon ratio determined by the set value of natural gas flow calculated in the computing unit 10.

The operation of this prior system is explained as follows. Fuel reformer apparatus 1 produces reformed gases rich in hydrogen from natural gas and steam as the raw materials. Generally, fuel reformer apparatus 1 consists of a plurality of reactors and heat exchangers, but reformer reactor 2 plays an important role in the preparation of hydrogen. Reformer reactor 2 is a reactor filled with a Nickel type catalyst. The reforming reaction is a violent endothermic reaction at an operation temperature of around 800° C., namely an endothermic reaction in which the mole numbers of the product components will increase to more than that of the raw material components. Accordingly, it is necessary to compensate for the operation temperature by heating the fuel reformer apparatus 1 by the use of the burner 3 from outside of the apparatus. Reformed gases prepared in a fuel reformer apparatus 1 are supplied to an anode in a fuel cell 4.

Fuel cell 4 generates a direct current electrical output from the hydrogen in said reformed gases and oxygen in separately supplied air to the cathode and a predetermined current flows in load 5. On the other hand, since the anode exhaust gases contain unreacted hydrogen and other combustible gases, the system efficiency is improved by burning these gases by burner 3 in the fuel reformer apparatus 1.

A method of controlling fuel flow in a fuel reformer apparatus depending upon the load is disclosed in U.S. Pat. No. 3,585,078 and a system wherein reformed gases as supplied from a high pressure fuel reformer apparatus when there is a sudden increase of load is disclosed in U.S. Pat. No. 4,098,959.

Turning again now to the system of FIG. 1, the operation of the control system in the system is explained referring to FIG. 1.

The amount of each of the flows of feed natural gas (generally a fuel gas), steam and reformed gases which are produced are feed-back controlled using flow meters 6a, 6b, 6c as sensors, regulation valves 7a, 7b, 7c as operation terminals, and flow regulators 9a, 9b, 9c as regulators. On the other hand, the direct current output from fuel cell 4 is detected at ammeter 8, the required reformed gas flow and any further required natural gas flow rates depending upon load are calculated in computing unit 10, and a set point value is given to flow regulators 9a, 9c. Required steam flow is calculated from a steam carbon ratio determined by ratio setting means 11, and this flow rate is given to flow regulator 9b as a set point.

In this manner, the fuel reformer apparatus 1 is controlled through the raw material control system controlled depending upon load 5 and the reformed gas flow rate control system.

Since a prior reformer reaction control system is constructed as mentioned above, there were faults in that the temperature of the reformer reactor in a fuel reformer apparatus would suddenly rise locally and exceed the threshold limit temperature of the construction materials, or the set control properties of the reaction temperature would drop down as a result of the openings at each natural gas, steam and reformed gas regulation valve being rapidly reduced. The reaction pressure is further transitionally raised so that the amount of reaction namely the endotherm is rapidly reduced. Moreover, as a time constant for the temperature is generally large in an oven type reactor, there are practical limits to raising the response rate of the reactor temperature control system even if the feed forward operation variable is given to the reactor temperature control system when the load is rapidly reduced, as it is necessary to restrict the regulation valve shutting speed when the load is suddenly reduced in order to protect the apparatus, consequently reducing the operational efficiency of the system.

SUMMARY OF THE INVENTION

It is an object of this invention to provide a reformer reaction control system for improving the constant control characteristics of the reaction temperature in a fuel reformer apparatus and for raising the system efficiency. The object of this invention is achieved by a control system for a reforming reaction comprising a fuel reforming means, said reforming being carried out by an endothermic reaction, a feed flow control system for controlling, depending upon an external load, the quantities of fuel gas and steam each introduced to said reforming means, a reformed gas flow control system for controlling, depending upon the external load, the quantity of reformed gases discharged from said fuel reforming means, a means for determining change rate of the load, a means for detecting pressure in the fuel reforming means and a reaction pressure control means by computing a transitional pressure preset value in the fuel reforming means on the basis of signals from said means for determining load change ratio and from said means for detecting pressure, said reaction pressure control means having a reaction pressure control system by which the pressure in the fuel reforming means is controlled transitionally below a steady state pressure preset value.

BRIEF DESCRIPTION OF THE DRAWINGS

FIGS. 4(a)-(g) variously represent the changes with time of the temperature, the methane reaction rate, the pressure in a reformer reactor, the opening of regulation valves 7a and 7c, etc.

DESCRIPTION OF THE PREFERRED EMBODIMENT

Figure 2:
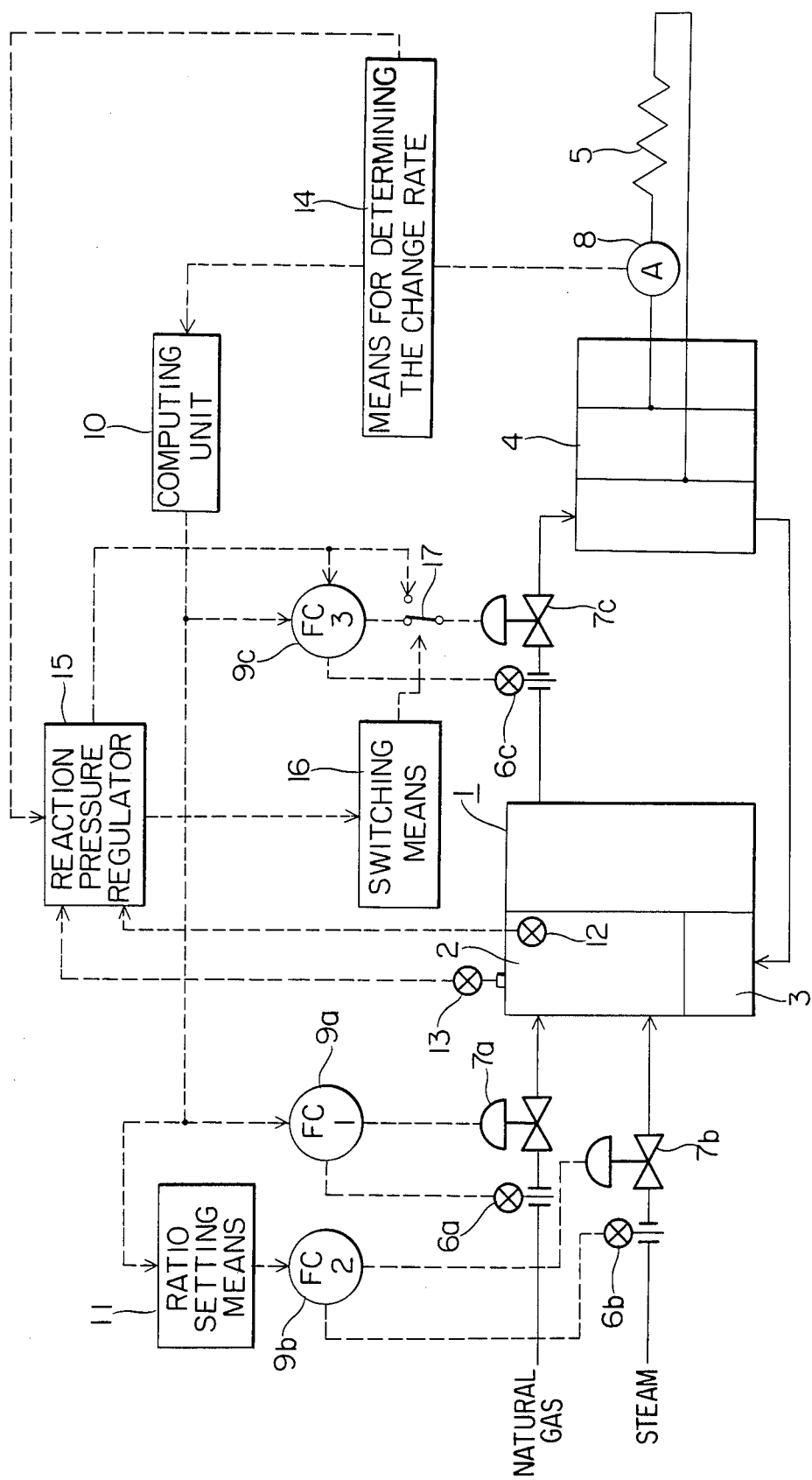
FIG. 2 is a block diagram of a reformer reaction control system in accordance with an embodiment of this invention.

An embodiment of this invention is explained on the basis of the drawings as follows:

FIG. 2, numbers 1 to 11 are used to refer to the same portions as in the prior system. Element 12 is a temperature detector of the reformer reactor; element 13 is a pressure detector of the reformer reactor; element 14 is an electrical output change rate measuring apparatus for fuel cell 4; element 15 is a reaction pressure regulator which establishes a transitional pressure based on signals from the temperature detector 12, the pressure detector 13 and the change rate measurng means 14; element 16 is a switching means for transitionally cutting off regulator valve 7c from the operating signal from the regulator 9c according to a signal from reactors pressure regulator 15.

In the drawing figures, solid lines indicates gas flow and broken lines indicate signal flow.

Next, the operation of the apparatus according to this invention will be explained as follows. The operation during normal running conditions is the same as in the prior example. When the load is changed, the rate of change is monitored by change rate measuring apparatus 14 as the rate of change of the direct current value in ammeter 8, the monitored results being transferred to reaction pressure regulator 15. The reaction pressure regulator 15 is provided in addition to a general feed back regulation function, a plurality of analog auxiliary signal input functions, digital signal output functions, and judgement functions. When the decrease rate of a load exceeds the decrease rate threshold limit (already inputted in reaction pressure regulator 15) determined on the basis of the previously measured temperature response data of reformer reactor 2, the reaction pressure regulator 15 calculates a set point the optimum pressure lower than the existing condition which is based on the signals from pressure detector 13, and then outputs a digital signal at switching means 16 to changeover switch 17 and directly operate regulation value 7c so as to adjust the pressure set value (to increase the opening of regulation valve 7c) and so as to set the reaction pressure to a lower value. Moreover, reaction pressure regulator 15 transfers the existing manipulated variable to reformed gas flow regulator 9c.

On the other hand, the metering operation for the natural gas and steam flow by computing unit 10 and ratio setting means 11 is same as in the prior example.

By means of the previous operation, the temperature rise will be mitigated enough to enable the temperature control system of reformer reactor 2 (not shown) to follow-up when the load is suddenly decreased, and when the temperature response of reformer reactor 2 is set according to a signal from temperature detector 12, the reactor pressure regulator 15 bolts the operation of regulation valve 7c by using switch means 16 after a set period of time, for example, and regulation valve 7c is controlled by flow regulator 9c as in the prior examples. It is possible to start operating the regulation valve 7c smoothly (bumpless switching) with the manipulated variable just before change over as an initial value, because the manipulated variable for regulation valve 7c is simultaneously and continuously transfered to flow regulator 9c.

In this manner, a sudden or localized rise of temperature of a reformer reactor in a fuel reformer apparatus is mitigated, so it becomes easy to protect the construction material of the reformer reactor. Accordingly, because the of the mitigation of transitional temperature rise, it is possible to make the control of the reaction temperature in the steady state of reaction even more rigorous, thereby improving the control characteristics to the predetermined temperature and thus enhancing the system efficiency that much more. Now the construction and the working operation of reformer pressure regulator 15 in FIG. 2 will be explained on the basis of the block diagram in FIG. 3. The load of the fuel cell is measured by ammeter 8, and its rate of change $\Delta i$ is determined by means 14 for determining the change rate.

When the change rate $\Delta i$ is positive, or even if the change rate $\Delta i$ is negative but the magnitude of $\Delta i$ does not amount to the predetermined threshold reduction rate, no output is issued by the decision means 18 and as a result a normal control is effected by the computing element 10. In this connection, the Inner Date Base 19 has been previously stored the characteristic data table of such a fuel cell plant and the threshold reduction rate determined on the basis of the data of the Inner Data Base 19 is input to the decision means 18.

On the other hand, if the change rate $\Delta i$ determined by the means 14 for determining change rate is negative and in addition, exceeds the threshold reduction rate, then an output is issued from the decision means 18 and the reduction rate $\Delta i$ at this point is output to computer 20. In the computer 20, $-\Delta p$ is sought from the Inner Data Base 19 on the basis of $\Delta i$ from the relationship between $-\Delta p$ and $\Delta i$ represented as $-\Delta p - f_1 (\Delta i)$ wherein $f_1$ is a function, and p represents a pressure value. In this connection in seeking $\Delta p$, a value of temperature T in the reformer reactor 2 can be added as a variable in addition to $\Delta i$. The output ($-\Delta p$) from computer 20 is transferred to the pressure regulator 21 in the reformer reactor 2. In the pressure regulator 21 a value (Pn) of pressure existing at that time in the reformer reactor 2 is input from pressure detector 13 and a pressure value reduced from Pn by $\Delta p$, namely, a transitional pressure preset value is calculated therein. The computer 20 outputs a starting digital signal to the switching means 16 simultaneously with the issue of output ($-\Delta p$). The switching means 16 switches the switch 17 from the normal control side to the transitional control side for the requisite period of time, normally a maximum of about 10 minutes which is determined on the basis of the thermal characteristics of the reforming reactor 2, namely, as a function of the volume of reformer reactor 2. Accordingly, regulation valve 7c is controlled on the basis of the transitional pressure set value set by the pressure controller 21. The requisite period of time may be terminated by the switching means 16 at a point where a detected temperature of the temperature detector 12 at the reformer reactor 2 is reduced below the predetermined temperature.

A normal or a steady state pressure set value at flow regulator 9c to which is input an output from the flow meter 6c, thereby being under normal control is always input to pressure controller 21 and said set value is referred to as an initial value when the regulation valve 7 is controlled by pressure controller 21.

Hereinafter the theoretical background is explained. Reactions occurring in the reformer reactor 2 are combined reactions generally expressed as in equations (1) and (2) below:

$$CH_4 + H_2O \rightleftharpoons CO + 3H_2 \quad (1)$$

$$CO + H_2O \rightleftharpoons CO_2 + H_2 \quad (2)$$

The equilibrium constant $K_1$ and $K_2$ for the reactions in equations (1) and (2) are shown hereinafter:

$$K_1 = \frac{n_{CO} \cdot n_{H_2}^3}{n_{CH_4} \cdot n_{H_2O}} \left(\frac{P}{\Sigma_n}\right)^2$$

wherein $n_{H_2}$, $n_{CO}$, $n_{CO_2}$, $n_{CH_4}$ and $n_{H_2O}$ represent molar quantity of each component, $\Sigma_n$ represents total moles of said components and P a total pressure of the system. Accordingly, if the reaction pressure is reduced, then the reaction in equation (1) proceeds towards the right thus the equilibrium point shifts to the right, namely the reaction rate of methane is increased, thereby increasing the heat to be absorbed.

The pattern of the reaction is elucidated by FIGS. 4(a)-(g). FIGS. 4(a) to 4(g) respectively represent the changes of the load, (i.e.—cell direct current output), the opening of regulation valve 7a, the pressure of the reformer reactor 1, the methane reaction rate and the temperature at the inner peripheral part of the reactor in the reforming reactor 2, the opening of the regulation valve 7c, and the surface temperature of the reformer reactor 1 with respect to time. The solid lines represent the operation phenomena according to the present invention and the broken lines represent the operation phenomena according to the conventional example.

Figure 3:
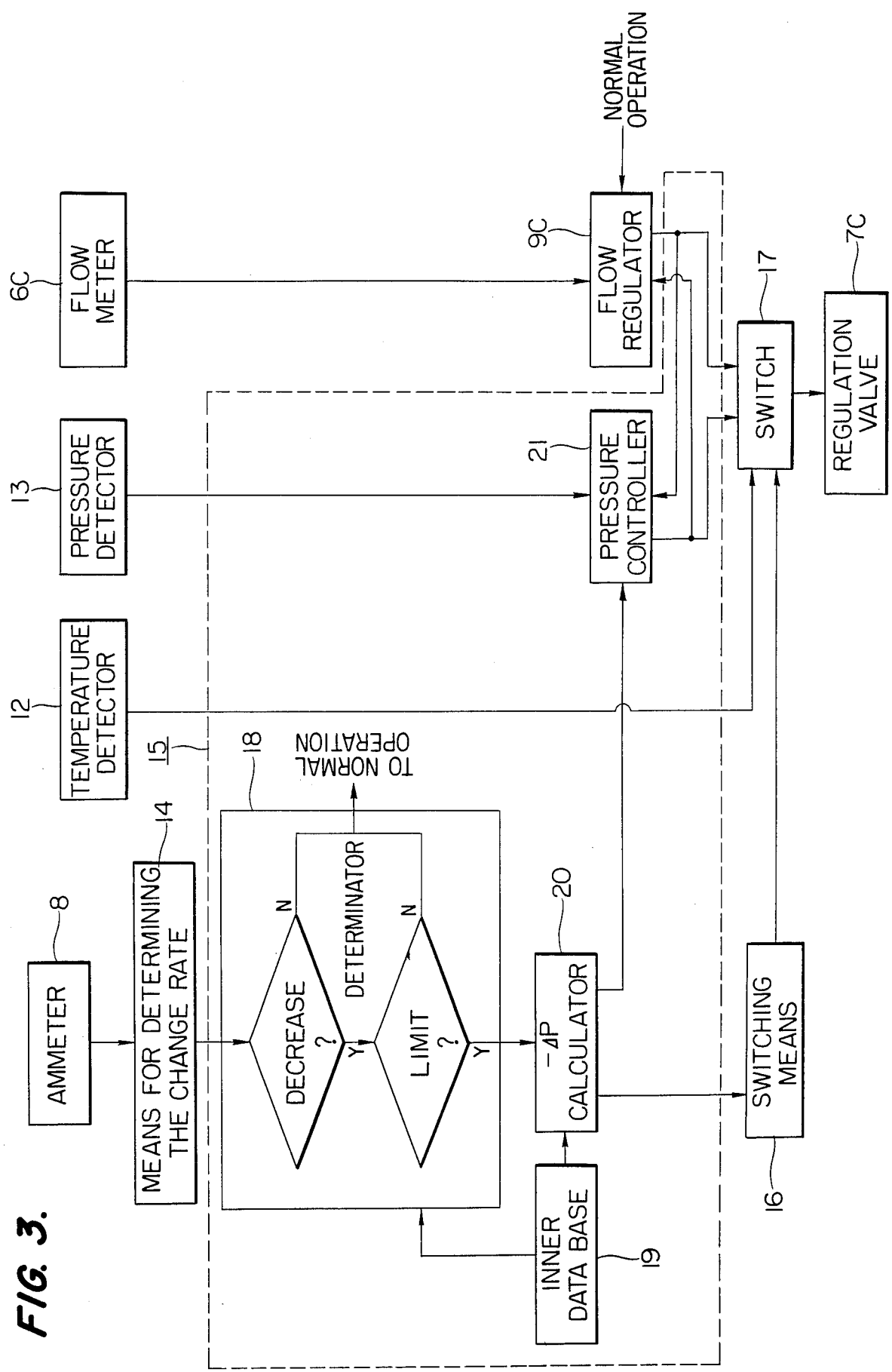
FIG. 3 is a block diagram showing the operation of a fuel cell in accordance with the present invention as compared with the prior example.
Figure 5:
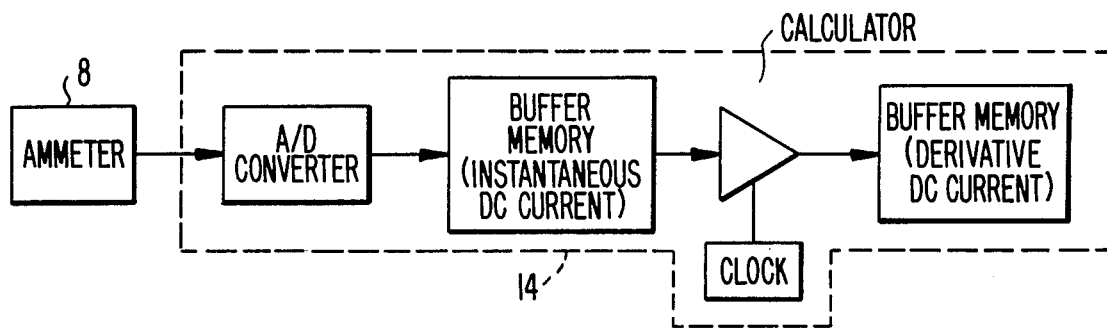
FIG. 5 is a more detailed version of a portion of FIG. 3.

FIG. 5 illustrates a portion of the block diagram illustrated in FIG. 3.

The output of the ammeter 8 is fed to an A/D converter whose output feeds a buffer memory which stores the instantaneous DC current. The output of the buffer memory is fed to a calculator used for deriving the actual DC current from the instantaneous current.

The output of the calculator is fed to another buffer memory which stores the derived DC current values.

The calculator derives the DC current change rate from the instantaneous DC current value utilizing the output of the first buffer memory and a clock which drives the calculator. The calculator solves the equation shown below:

$$\Delta i = \frac{i_n - i_{n-1}}{\Delta t}$$

where $\Delta i$ = fuel cell output (direct) current change rate $i_n$ = instantaneous direct current value in a current output at present time measurement $i_{n-1}$ = instantaneous direct current value in a current output one pulse before the present time measurement $\Delta t$ = sampling cyclic period Note that a 12 bit resolution is sifficient for the A/D converter and a sampling cycle period of approximately 250 ms may be used.

The determinator 18 determines the direction of the signal output from the means for determining the change rate 14. If the signal is negative (i.e.—the load is being decreased), the determinator 18 determines if the rate of change is slow or rapid. The threshold value separating the slow rate from the fast rate is, for example, 25 percent per second on the basis of the rapid load being 100 percent. However, the threshold value varies depending upon the plant to which the system is to be applied and the initial value of the change generation. Therefore, the predetermined plant characteristics are retained in the internal memory of the controller as inner data base 19.

Figure 6:
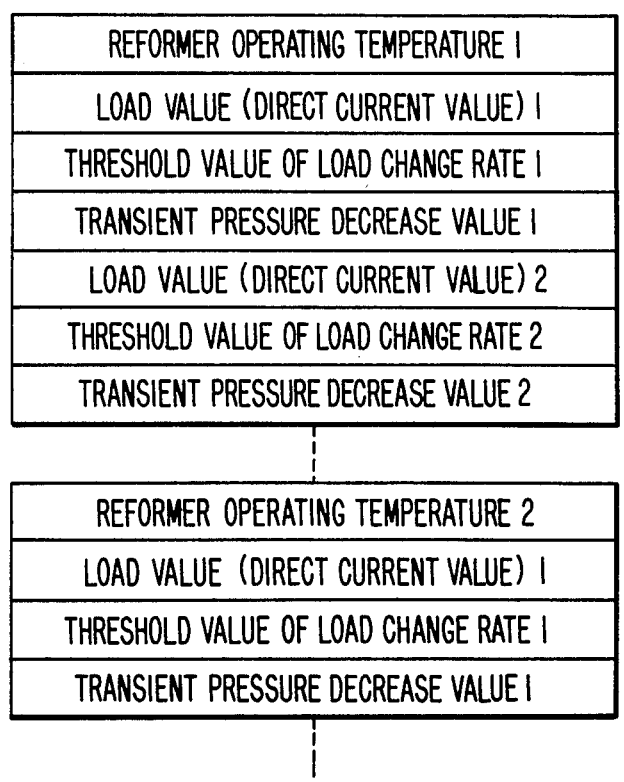
FIGS. 6 and 7(a)-(c) are respectively the memory arrangement and examples used in explaining the operation of the memory.

The inner data base 19 has an arrangement as illustrated in FIG. 6 when the reformer operating temperature is the main parameter.

Figure 7A:
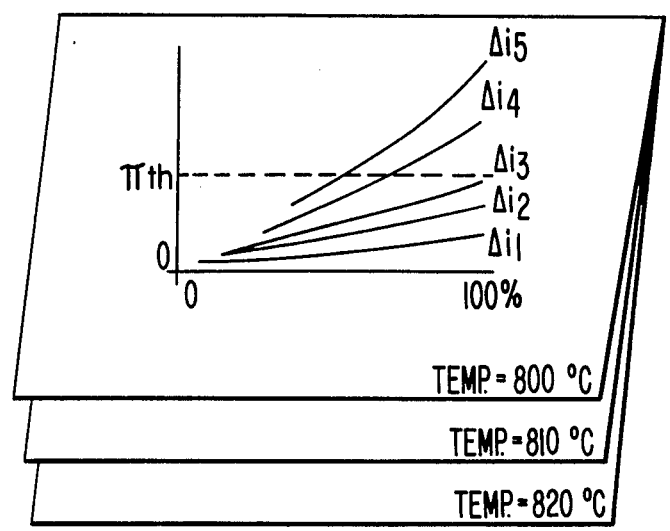

In FIG. 7(a), the ordinate represents the increase of temperature in a reformer under ordinary operation and the abscissa represents a load immediately prior to the generation of a rapid decrease in the load.

$T_{ref}$: an increase in a temperature in a reformer in ordinary operation is measured by changing $\Delta i$ (the rate of change of direct current) for the load immediately prior to the generation of a rapid decrease of load employing the operation temperature in a reformer as a parameter. For each $T_{ref}$, the area at which the $\Delta T_{th}$ (the threshold value of the increase of temperature in a reformer) is passed over is then determined.

Figure 7B:
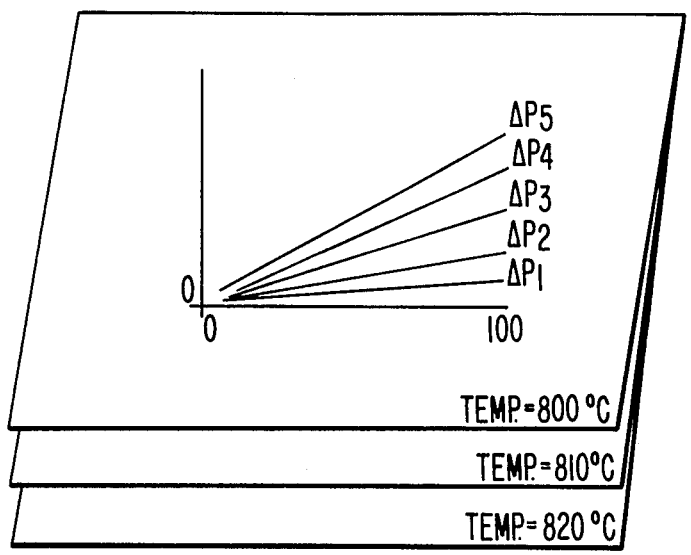

In FIG. 7b, the ordinate represents—T (i.e.—a transient decrease of temperature in a reformer caused by the reduction of pressure) and the abscissa represents a load condition.

A transient decrease of temperature in a reformer is measured by changing $\Delta p$ (a transient decrease of pressure) for a load condition employing $T_{ref}$ as a parameter.

Figure 7C:
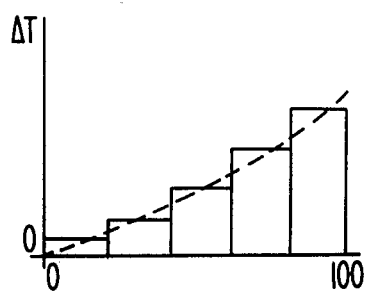

The data noted above is subjected to digitization as illustrated in FIG. 7(c). In general, it is believed that taking five points for the load in each case, for example—at 20 percent intervals, is sufficiently adequate for the operation of the present system.

The $\Delta p$ calculator operates for the estimation of the condition of the plant on the basis of the inner data base 19, that is, the prediction of the increased temperature value in a reformer.

The $\Delta p$ calculator 20 also calculates the set values of the transient pressure required for suppressing the increase of temperature. That is, it retrieves the value of $\Delta p$ called for by the inner data base 19.

The $\Delta p$ calculator 20 outputs a signal which is used by the pressure controller 21.

Figure 1:
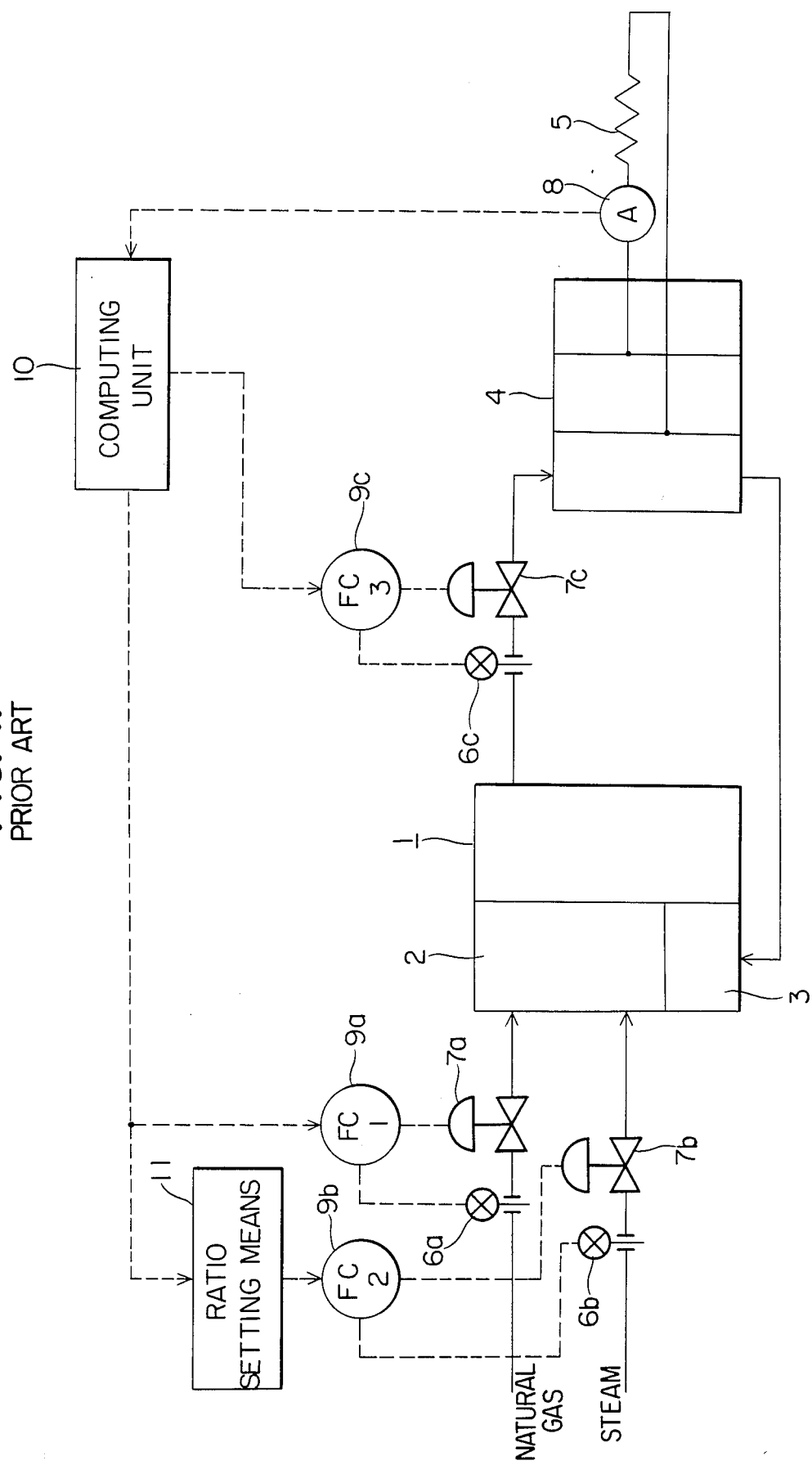
FIG. 1 is a block diagram of a prior reformer reaction control system.

The normal operation of the system is explained based on FIG. 1. When computing unit 10 detects the reduction of load by ammeter 8, it decreases the set point of 9b depending upon the reduction of load through 9c, 9a and 11. Thus, the opening of the control valves 7c, 7a and 7b become smaller.

The pressure of reformer 1 transiently increases due to the time lag between 7a, 7b and 7c and thereafter it become lower than the pressure prior to the change depending upon the reduction of the flow in 6a and 6b.

As the response of the temperature control system (not shown) in reformer 1 is delayed by a factor 10 times relative to the response to the pressure flow controls ystem transient fluctuation in temperature cannot be controlled by burner 3.

In normal operation, as explained above, it is assumed that a transient increase of temperature of more than 100° C. may happen if the rate of change in the load is quite rapid. The cause of such a transient increase is the impossibility of the temperature control system in the reformer to respond faster than 10 minutes. It is also because as the regulation valve 7c in the exit of reformer 1 operates towards the closing direction in normal operation, the pressure in the reformer transiently increases, reducing the rate of reaction thereby rapidly decreasing the endothermal heat.

The present invention provides a system for judging the condition of the reformer from the rate of decrease of the load where the temperature in the reformer goes beyond the acceptable threshold of the constructing material of the reformer, usually a centrifuged ingot alloy based on nickel and chromium, due to a too severe transient rise in temperatuer of the reformer. The acceptable threshold temperature for such alloy is normally above 920° C.

Further, in order to relax the transient increase of tempearture in the reformer the control function of the regulating value 9c temporary converts to a pressure control function from a flow rate control function and in addition thereto, and the decrease of the set point of the pressure to that of a normal one makes it possible to increase the reaction rate in the reformer thereby preventing the reduction of endothermal heat. Therefore the opening of the valve 7c temporary moves towards open.

What is claimed is:

1. A control system for a reforming reaction comprising a fuel reforming means, said reforming being carried out by an endothermic reaction, a feed flow control system for controlling, depending upon an external load, the quantities of fuel gas and steam which are each introduced into said reforming means, a reformed gas flow control system for controlling, depending upon said external load, the quantity of reformed gases discharged from said fuel reforming means, a means for determining change rate of the load, a means for detecting a pressure in the fuel reforming means and a reaction pressure control means by computing a transistional pressure preset value in the fuel reforming means on the basis of signals from said means for determining load change ratio and from said means for detecting pressure, said reaction pressure control means having a reaction pressure control system by which the pressure in the fuel reforming means is controlled transistionally below a steady state pressure preset value when said change rate of the load is outside a predetermined range.

2. A control system for a reforming reaction wherein said means for determining load change is a means for determining a change in electrical load current, wherein a change rate in current output from the fuel cell is determined.

* * * * *